US008787355B2

(12) United States Patent
Benco et al.

(10) Patent No.: US 8,787,355 B2
(45) Date of Patent: Jul. 22, 2014

(54) METHOD TO INTERACT WITH PACKET-NETWORK BASED SERVICES AND APPLICATIONS VIA INTELLIGENT NETWORK SIGNALING

(75) Inventors: David S. Benco, Winfield, IL (US);
Mark A. Ristich, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 1042 days.

(21) Appl. No.: 12/592,484

(22) Filed: Nov. 25, 2009

(65) Prior Publication Data
US 2011/0122861 A1 May 26, 2011

(51) Int. Cl.
*H04L 12/66* (2006.01)
(52) U.S. Cl.
USPC ............................................. 370/352
(58) Field of Classification Search
None
See application file for complete search history.

(56) References Cited

U.S. PATENT DOCUMENTS

| 6,622,016 | B1 * | 9/2003 | Sladek et al. | 455/414.1 |
| 6,963,635 | B1 * | 11/2005 | Jones | 379/114.14 |
| 2002/0072367 | A1 * | 6/2002 | Osafune et al. | 455/433 |
| 2006/0025140 | A1 * | 2/2006 | Bales et al. | 455/445 |
| 2010/0111076 | A1 * | 5/2010 | Duffy et al. | 370/352 |

FOREIGN PATENT DOCUMENTS

| EP | 1 788 764 A1 | 5/2007 |
| WO | WO 2007/120875 A2 | 10/2007 |

* cited by examiner

*Primary Examiner* — Minh-Trang Nguyen
(74) *Attorney, Agent, or Firm* — Carmen Patti Law Group, LLC

(57) ABSTRACT

A cross domain server is configured to receive calls to at least one predetermined phone number. The cross domain server is a member of a packet-switched network. The cross domain server receives a call setup message for a call from a subscriber outside of the packet-switched network. The cross domain server performs an action in the packet-switched network on behalf of the subscriber and based on the call. The call is disconnected.

20 Claims, 2 Drawing Sheets

METHOD TO INTERACT WITH PACKET-NETWORK BASED SERVICES AND APPLICATIONS VIA INTELLIGENT NETWORK SIGNALING

TECHNICAL FIELD

The invention relates generally to telecommunications and more particularly to blended configuration of circuit and packet-switched networks.

BACKGROUND

Most existing end-user devices of subscribers in cellular networks are not based on internet-protocol communication standards of packet-switched networks. While some devices are capable of communicating in packet-switched networks, they may roam to other circuit-switched networks outside of the packet-switched network. In order to support access to features of packet-switched networks to subscribers from legacy circuit-based networks and devices, some prior solutions required a call from the subscriber to be anchored into the packet-switched network or support for special capabilities. Since many packet-switched features do not require a bearer channel for their functionality, network resources of both the packet-switched and circuit switched network are wasted when these features are utilized by a subscriber using a legacy circuit-based network or device.

As one example, 3GPP standards have specified a solution to support an interne protocol (IP) multimedia subsystem (IMS) Centralized Services model by using unstructured supplementary service data (USSD) messages as the method for transporting these signals or feature codes to the IMS network. However, 3GPP2 does not support USSD or its equivalent, so not only is there currently no standardized solution for this problem in 3GPP2 markets, but mobiles that support USSD are not widely available in 3GPP markets.

In circuit-switched networks, the configuration of subscriber-modifiable parameters may be accomplished in several different ways, depending upon the particular telecommunications network technology that serves the subscriber. While there are multiple methods for supplementary service interaction, they are generally vendor-specific. For circuit-based subscribers, typically there is a "feature code" or "*" code that can be dialed by the subscriber, and the local switch, during digit analysis, recognizes the * code and handles it appropriately. These "feature codes" and their interpretation are generally vendor specific such as *33 [CallForwardNumber] #, where "*33" is the feature code to change the call forwarding number as indicated. However, maintenance of these dialing plans across multiple regions is operationally problematic and resource intensive.

In the IMS domain for example, there are several innovative features such as WEB-based routing services that can be updated not only from a PC over the internet, but also from IMS enabled UEs. It is currently not feasible for a subscriber to interact with such a service with circuit-based access. While this could be addressed via USSD as specified in 3GPP markets, there is currently no equivalent solution in 3GPP2, and no 3GPP solution when using mobiles that do not support USSD. In general, it is inconvenient or impossible for circuit-based subscribers to avail themselves of these IP-based services using the methods currently available.

Thus, a need exists for a more efficient use of resources for utilization of packet-switched network features.

SUMMARY

The invention in one implementation encompasses a method. A cross domain server configured to receive calls to at least one predetermined phone number receives a call setup message for a call from a subscriber outside of a packet-switched network. The cross domain server is a member of the packet-switched network. The cross domain server performs an action in the packet-switched network on behalf of the subscriber and based on the call. The call is disconnected.

Another implementation of the invention encompasses an apparatus. The apparatus comprises a cross domain server configured to receive calls to at least one predetermined phone number. The cross domain server is a member of a packet-switched network. The cross domain server is configured to perform an action in the packet-switched network on behalf of a subscriber of a call received by the cross domain server from outside of the packet-switched network. The cross domain server is configured to disconnect the call after performing the action.

A further implementation of the invention encompasses an article. The article comprises one or more computer-readable signal-bearing media. The article comprises means in the one or more media for receiving, at a cross domain server configured to receive calls to at least one predetermined phone number, a call setup message for a call from a subscriber outside of a packet-switched network. The cross domain server is a member of the packet-switched network. The article further comprises means in the one or more media for performing an action in the packet-switched network, by the cross domain server, on behalf of the subscriber and based on the call. The article further comprises means in the one or more media for disconnecting the call.

DESCRIPTION OF THE DRAWINGS

Features of example implementations of the invention will become apparent from the description, the claims, and the accompanying drawings in which:

DETAILED DESCRIPTION

Figure 1:
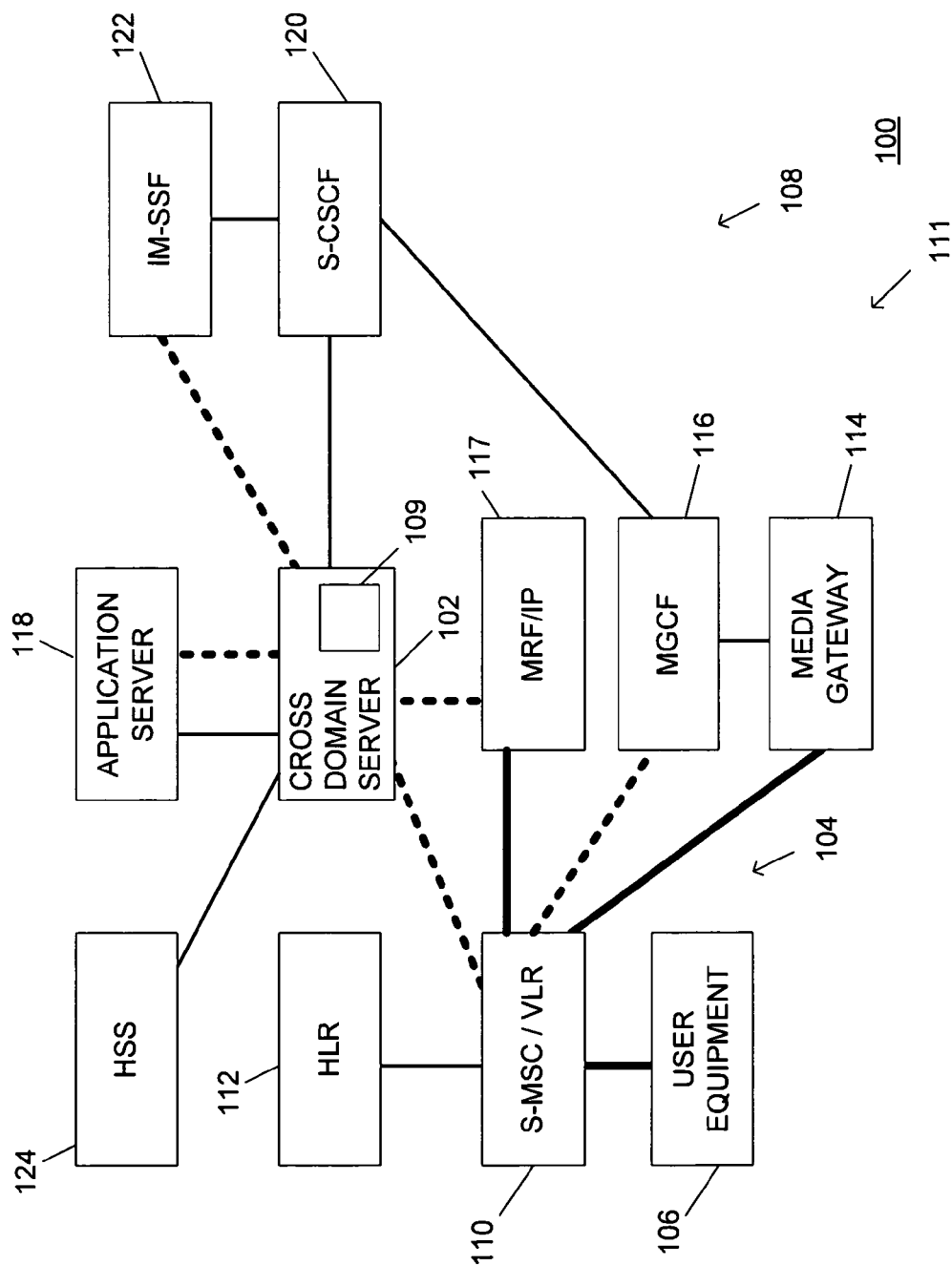
FIG. 1 is a representation of one implementation of an apparatus that comprises a cross domain server coupled with a circuit-switched network and a packet-switched network.

Turning to FIG. 1, an apparatus 100 in one example comprises a cross domain server 102, a circuit-switched network 104, a user equipment (UE) 106, and a packet-switched network 108. The cross domain server 102 in one example is configured to be a member of the circuit-switched network 104 and the packet-switched network 108 and also to be accessible via one or more of wireless intelligent network (WIN), ANSI-41, CAMEL, ETSI INAP and SS7 signaling protocols. In one example, the cross domain server 102 comprises an instance of a recordable data storage medium 109, as described herein. The circuit-switched network 104 in one example comprises a legacy cellular network or public switched telephone network. The UE 106 in one example comprises a mobile phone, smart phone, personal digital assistant, wireless device, or other communication device.

The cross domain server 102, the circuit-switched network 104, and the packet-switched network 108 in one example are configured to operate as a blended circuit/packet switched network 111. In the implementation of FIG. 1, the packet-switched network 108 comprises an internet protocol (IP) multimedia subsystem (IMS) network with a media gateway 114 and media gateway control function (MGCF) 116, a media resource function/intelligent peripheral (MRF/IP) 117, an application server 118 (or other packet network application provider), a serving call session control function (S-CSCF) 120, an IP multimedia service switching function (IM-SSF) 122 and a home subscriber server (HSS) 124. The packet-switched network 108 is interfaced with the circuit switched network 104 which comprises a serving mobile switching center/visitor location register (S-MSC/VLR) 110 and a home location register (HLR) 112. Examples of features provided by the packet-switched network 108 comprise updating WEB-based routing preferences, toggling network features (e.g., voice mail delivery preferences between speech vs. text), updating subscriber policy rules (e.g., presence, busy status, etc.), requesting information (e.g., weather, sports statistics, etc.) to be sent to the user equipment 106 via SMS, and other features.

The cross domain server 102 is configured to receive calls to at least one predetermined phone number, or "public service identity." In a first example, a subscriber/user of the UE 106 is provisioned as an intelligent network subscriber in the HLR/HSS 112 with an origination intelligent network trigger. In a further example, the origination intelligent network trigger is a wireless intelligent network (WIN) trigger of type "all calls" such that all calls originating from the UE 106 are directed to the cross domain server 102. The origination intelligent network trigger causes the S-MSC/VLR 110 to direct an incoming call from the UE 106, or the handling thereof, to the cross domain server 102. In this example, the cross domain server 102 acts analogously to a service control point (SCP), as will be appreciated by those skilled in the art. In another example, the S-MSC is configured to direct only calls to the predetermined phone numbers to the cross domain server 102.

Figure 2:
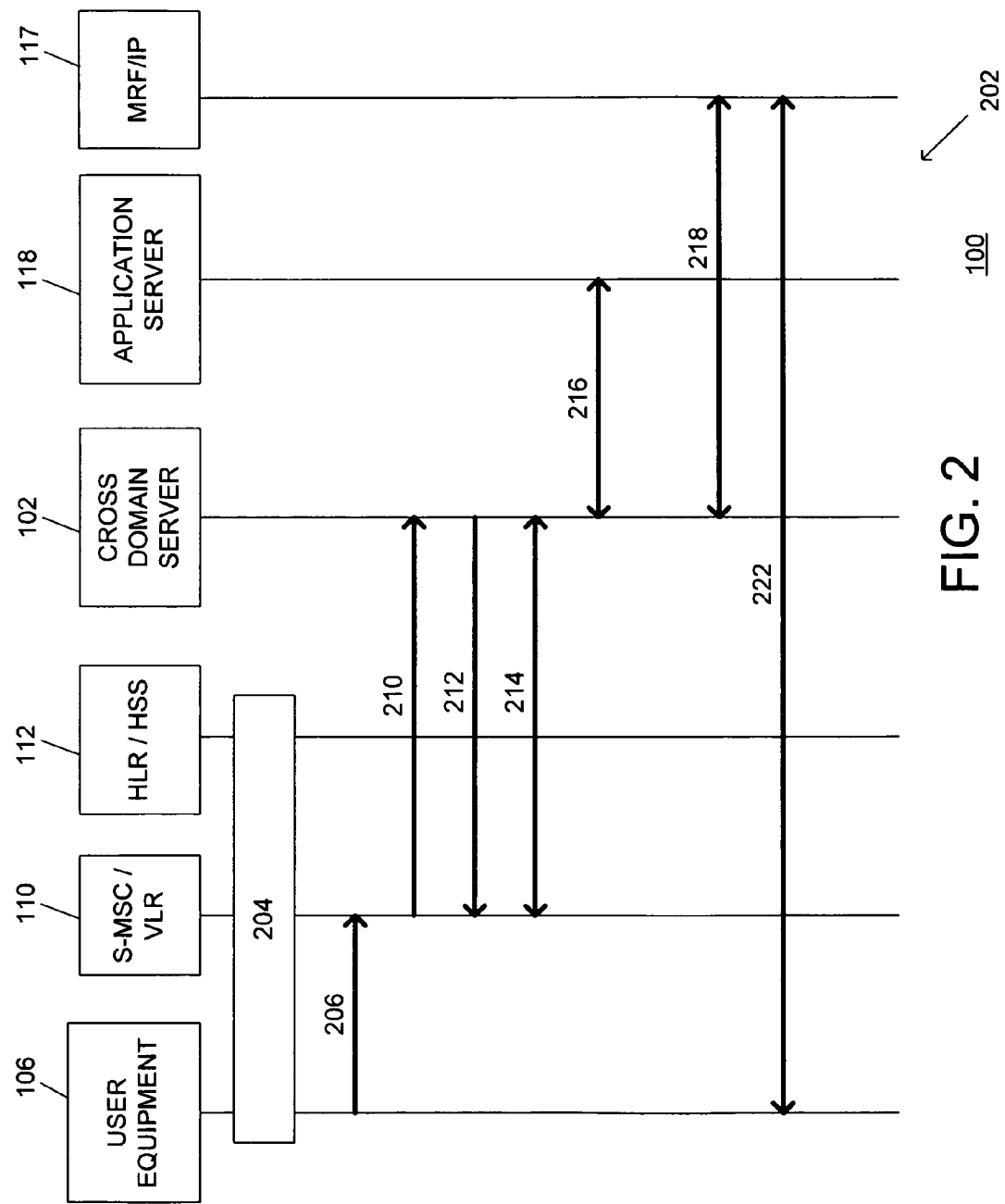
FIG. 2 is a representation of one message flow for feature access through the cross domain server of the apparatus of FIG. 1.

An illustrative description of operation of the apparatus 100 is presented, for explanatory purposes. Turning to FIG. 2, one example of a message flow 202 provides access to features of the packet-switched network 108 by the UE 106 through the cross domain server 102 using WIN signaling. Alternate implementations using ANSI-41 signaling or other protocols will be apparent to those skilled in the art. The UE 106 sends a call request message 204 through the circuit-switched network 104 (FIG. 1) to the S-MSC/VLR 110. The call request message 204 in one example comprises an initial address message ("IAM") of the integrated services digital network user part ("ISUP") protocol with a called party number and calling party number for the call. In one example, the call request is initiated by the subscriber manually entering a phone number. In another example, the UE 106 automatically forms the call request based on menu commands, keystrokes, or voice prompts from the subscriber.

In the implementation of FIG. 2, originating intelligent network (IN) triggers are set in the S-MSC/VLR 110 when the UE 106 registers (204). When a call is originated (206) the S-MSC/VLR 110 will send a query message 210 to the cross domain server 102 (acting as a service control point, SCP) for call handling instructions, for example, using WIN signaling protocol. The query message 210 in one example comprises the called party number and calling party number for the call and a service key associated with the subscriber. The service key would be one of the cross domain blending services such as modifying a subscriber-modifiable parameter associated with the subscriber, toggling a feature activation status for the subscriber, creating an information request on behalf of the subscriber, and activating or deactivating services.

Upon receipt of the query message 210, the cross domain server 102 analyzes the called party number for the call. If the called party number is not one of the predetermined phone numbers (i.e. a service indicator), the cross domain server 102 sends a "continue" message 212 to the S-MSC/VLR 110 for standard call processing.

If the called party number is one of the predetermined phone numbers, the cross domain server 102 is configured to perform an action in the packet-switched network on behalf of the subscriber. After performing the action on behalf of the subscriber, the cross domain server 102 sends a release message 214 to the S-MSC/VLR 110 to disconnect the call. Accordingly, the action is performed in the packet-switched network without establishment of a bearer channel in the packet-switched network for the call. Examples of actions comprise modifying a subscriber-modifiable parameter associated with the subscriber, toggling a feature activation status for the subscriber, creating an information request on behalf of the subscriber, and activating or deactivating services. Additional actions to be performed such as running a service, executing an application, call processing, signaling, or handling procedures will be apparent to those skilled in the art.

In a first implementation, the cross domain server 102 determines the appropriate action to take based on the called party number and optionally the service key, for example, through employment of a look-up table. The cross domain server 102 may also employ one or more of a current location of the subscriber, a current time of day, one or more subscriber policy rules, one or more network policy rules, or other variables or parameters, as will be appreciated by those skilled in the art. In another example, the cross domain server 102 employs the called party number as a Service Identifier. For example, each of the predetermined phone numbers corresponds to a different action or service to be performed. The cross domain server 102 employs the calling party number to identify which subscriber requested the action. In one example, the cross domain server 102 sends a signaling message 216 to the application server 118 or other communication device to perform the action. Examples of the signaling message 216 comprise session initiation protocol (SIP) messages, hyper text transport protocol (HTTP) messages, WIN messages, lightweight directory access protocol (LDAP), extensible markup language (XML), ParlayX, or other signaling messages.

In a second implementation, the cross domain server 102 is configured to set up a communication session with another server or communication device to obtain additional information from the subscriber. In one example, the cross domain server 102 configures (218) a communication session (222) between the subscriber and the MRF/IP 117 where the MRF/IP 117 acts as an interactive voice response server. In another example, the MRF/IP 117 is configured to receive input from the UE 106 via dual-tone multi-frequency (DTMF) signals. The subscriber can interact with the MRF/IP 117 to provide additional information for performing the action. For example, the subscriber may enter an updated credit card number, call forwarding number, address, zip code, or other information. The MRF/IP 117 provides this information to the cross domain server 102 for performing the action on behalf of the subscriber, after which the connection with the MRF/IP 117 is torn down using known procedures.

The solution presented herewith extends to any case where it is desirable for a circuit signaling interaction with an application without the need to utilize bearer trunks to anchor a call. Additionally, this provides any telecommunications subscriber (whether circuit-based wireline POTS, mobile/cellular, PC-based IMS soft phone, etc.) a uniform way of interacting with his/her telecommunication service, such as configuration, invocation, modification, etc. For example, configuring a call forwarding number would be identical regardless of communication technology, device, etc.

Numerous alternative implementations of the present invention exist. For 3GPP2 packet-switched networks, the subscriber would be provisioned in their HLR with an originating WIN "All_Calls" trigger, or a wireline subscriber would be provisioned in their exchange with intelligent network application part (INAP) or advanced intelligent network (AIN) triggers as appropriate. For 3GPP packet-switched networks, the subscriber would be provisioned in their HLR with an originating unconditional (customized applications for mobile networks enhanced logic) CAMEL trigger, or a wireline subscriber would be provisioned in their exchange with appropriate INAP. Other origination triggers or protocols such as ANSI-41, CAMEL, and ETSI INAP may also be employed.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 109 of the cross domain server 102. The computer-readable signal-bearing medium for the apparatus 100 in one example comprise one or more of a magnetic, electrical, optical, biological, and atomic data storage medium. For example, the computer-readable signal-bearing media comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for providing packet-switched network services to a circuit-switched network user equipment (UE), comprising the steps of:
    provisioning the circuit-switched network UE as an Intelligent Network (IN) subscriber;
    receiving, at a cross domain server operatively coupled to both the packet-switched and circuit-switched networks, a call setup message for a call to a phone number from the circuit-switched network UE to access a service provided by the packet-switched network;
    initiating the service in the packet-switched network without establishing a bearer channel by the cross domain server, on behalf of the circuit-switched network UE; and
    disconnecting the call.

2. The method of claim 1, wherein the at least one phone number comprises a called party number for the call.

3. The method of claim 1, wherein the call setup message comprises:
    an origination intelligent network trigger associated with the circuit-switched network UE.

4. The method of claim 3, wherein the origination intelligent network trigger comprises a wireless intelligent network (WIN) trigger type of "all calls."

5. The method of claim 3, wherein the origination intelligent network trigger is from an ANSI-41, CAMEL, ETSI INAP or intelligent network protocol.

6. The method of claim 1, wherein the service initiated in the packet-switched network comprises any of:
    modifying one or more subscriber-modifiable parameters associated with the circuit switched network UE;
    toggling a feature activation status for the circuit-switched network UE;
    creating an information request on behalf of the circuit-switched network UE;
    activating a service;
    deactivating a service;
    running a service; and
    executing an application.

7. The method of claim 1, wherein the step of initiating comprises the step of:
    determining the action to perform in the packet-switched network based on one or more of:
    a called party number for the call;
    a calling party number for the call;
    a service key associated with the call;
    one or more circuit-switched network UE policy rules;
    one or more network policy rules;
    a current location of the circuit-based UE; and
    a current time of day;
    wherein the at least one phone number comprises the called party number.

8. The method of claim 1, wherein the step of initiating comprises the step of:
    determining the action to be performed by using the at least one phone number as a Service Identifier.

9. The method of claim 1, wherein the step of initiating comprises the step of:
    routing the call to an interactive voice response server; and
    performing the action based on information received from the interactive voice response server.

10. The method of claim 1 wherein the service comprises:
    allowing the circuit-switched network LE to change subscriber-modifiable parameters in the packet-switched network.

11. An apparatus, comprising:
    across domain server, coupled to an serving call session control function (S-CSCF) that controls call sessions in a packet-switched network, said cross domain server configured to operate in the packet-switched network and in a circuit-switched network, said cross domain server further configured to receive calls to at least one phone number from a user equipment (UE) in the circuit-switched network;
    wherein the cross domain server is configured to perform an action in the packet-switched network on behalf of a the UE in the circuit-switched network without communicating with the S-CSCF to establish a bearer channel;
    wherein the cross domain server is configured to disconnect the call after performing the action.

12. The apparatus of claim 11, wherein the at least one phone number comprises a called party number of the call.

13. The apparatus of claim 11, wherein the UE in the circuit-switched network is provisioned with an origination intelligent network trigger to cause a query to be sent to the cross domain server based on the origination intelligent network trigger.

14. The apparatus of claim 13, wherein the origination intelligent network trigger comprises a wireless intelligent network (WIN) trigger type of "all calls."

15. The apparatus of claim 11, wherein the UE in the circuit-switched network is provisioned with an origination trigger to cause a query to be sent to the cross domain server based on the origination trigger.

16. The apparatus of claim 11, wherein the action comprises one or more of:
    an update, modification, or toggle of a subscriber-modifiable parameter or preference associated with the user equipment;
    an activation or deactivation of a service;
    running a service;
    executing an application; and
    a request for information to be sent to the user equipment.

17. The apparatus of claim 11 wherein the action comprises:
    allowing the UE in the circuit-switched network to change subscriber-modifiable parameters in the packet-switched network.

18. An article for use in providing packet-switched network services to a circuit-switched network user equipment (UE), comprising:
    one or more tangible, non-transitory computer-readable media; and
    means in the one or more media for receiving, at a cross domain server operatively coupled to both the packet-switched and circuit-switched networks, a call setup message for a call to a phone number from the circuit-switched network UE to access a service provided by the packet-switched network;
    means in the one or more media for initiating the service in the packet-switched network without establishing a bearer channel by the cross domain server, on behalf of the circuit-switched network UE;
    means in the one or more media for disconnecting the call.

19. The article of claim 18, wherein the means in the one or more media for receiving comprise:
    means in the one or more media for receiving an origination intelligent network trigger associated with the circuit-switched network UE.

20. The article of claim 18, wherein the means in the one or more media for initiating comprise:
    means in the one or more media for determining the service to initiate in the packet-switched network based on a called party number for the call, wherein the at least one phone number comprises the called party number.

* * * * *